(12) United States Patent
Ozawa et al.

(10) Patent No.: US 10,430,927 B2
(45) Date of Patent: *Oct. 1, 2019

(54) IMAGE ANALYZING APPARATUS AND NON-TRANSITORY STORAGE MEDIUM STORING INSTRUCTIONS EXECUTABLE BY THE IMAGE ANALYZING APPARATUS

(71) Applicant: BROTHER KOGYO KABUSHIKI KAISHA, Nagoya-shi, Aichi-ken (JP)

(72) Inventors: Ryohei Ozawa, Nagoya (JP); Kosuke Mori, Handa (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/640,626

(22) Filed: Jul. 3, 2017

(65) Prior Publication Data

US 2018/0068420 A1 Mar. 8, 2018

(30) Foreign Application Priority Data

Sep. 8, 2016 (JP) .................................. 2016-175450

(51) Int. Cl.
*G06K 9/40* (2006.01)
*G06T 5/00* (2006.01)
(Continued)

(52) U.S. Cl.
CPC .............. *G06T 5/002* (2013.01); *G06K 9/00* (2013.01); *G06K 9/342* (2013.01); *G06K 9/4638* (2013.01);
(Continued)

(58) Field of Classification Search
CPC ..................... G06T 5/002; G06T 2207/30176
See application file for complete search history.

(56) References Cited

U.S. PATENT DOCUMENTS

| 6,561,980 B1 * | 5/2003 | Gheng | A61B 8/12 600/443 |
| 2004/0042640 A1 * | 3/2004 | Ikeda | G06K 9/40 382/115 |

(Continued)

FOREIGN PATENT DOCUMENTS

| JP | 2005-196282 A | 7/2005 |
| JP | 2006-072839 A | 3/2006 |
| JP | 2009-105653 A | 5/2009 |

*Primary Examiner* — Samir A Ahmed
(74) *Attorney, Agent, or Firm* — Scully Scott Murphy & Presser, P.C.

(57) ABSTRACT

In an image analyzing apparatus, a controller in a first analyzing process performs: sequentially identifying line pixel groups from a first side in a first direction; and determining whether a first-type pixel not contiguous to a first subject group constituted by at least one first-type pixel contiguous to each other in a second direction is present in a first region surrounding the first subject group, using first relevant information relating to each line pixel group located on the first side. In a second analyzing process, the controller performs: sequentially identifying the line pixel groups from a second side in the first direction; and determining whether the first-type pixel not contiguous to the first subject group is present in a second region surrounding the first subject group, using second relevant information relating to each line pixel group located on a second side.

9 Claims, 10 Drawing Sheets

(51) Int. Cl.
*G06K 9/00* (2006.01)
*G06K 9/34* (2006.01)
*G06K 9/46* (2006.01)

(52) U.S. Cl.
CPC .................. *G06K 2209/01* (2013.01); *G06T 2207/30176* (2013.01)

(56) References Cited

U.S. PATENT DOCUMENTS

| | | | | |
|---|---|---|---|---|
| 2006/0238613 | A1* | 10/2006 | Takayama | G06T 15/405 |
| | | | | 348/47 |
| 2008/0226196 | A1* | 9/2008 | Kojima | G06K 9/3275 |
| | | | | 382/289 |
| 2009/0323131 | A1* | 12/2009 | Toyoda | G06T 3/608 |
| | | | | 358/448 |
| 2011/0158554 | A1* | 6/2011 | Uemura | G06K 9/40 |
| | | | | 382/275 |
| 2011/0160894 | A1* | 6/2011 | Yamada | D05C 5/04 |
| | | | | 700/138 |
| 2013/0063788 | A1* | 3/2013 | Iwayama | G06K 9/00442 |
| | | | | 358/448 |
| 2014/0285861 | A1* | 9/2014 | Kondo | G06K 9/2063 |
| | | | | 358/538 |
| 2014/0293383 | A1* | 10/2014 | Ozawa | H04N 1/2338 |
| | | | | 358/538 |
| 2015/0071564 | A1* | 3/2015 | Sasaki | H04N 5/3675 |
| | | | | 382/275 |

* cited by examiner

FIG.6

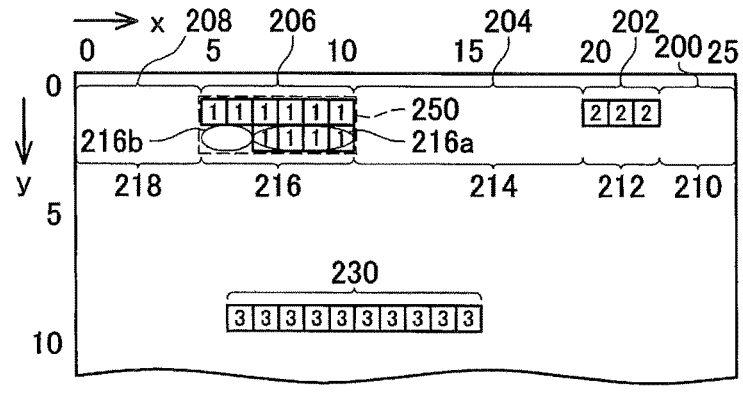

(y=0)
x-DIRECTION INFORMATION: -26-25-24-23-22-21-20-19-18-17-16-15-14-13-12-11-10-9-8-7-6-5-4-3-2-1
y-DIRECTION INFORMATION: -1-1-1-1-1-1-1-1-1-1-1-1-1-1-1-1-1-1-1-1-1-1-1-1-1-1

(y=1)
x-DIRECTION INFORMATION: -5-4-3-2-1 6 5 4 3 2 1 -9-8-7-6-5-4-3-2-1 3 2 1 -3-2-1
y-DIRECTION INFORMATION: -1-1-1-1-1-1-1-1-1-1-1-1-1-1-1-1-1-1-1-1-1-1-1-1-1-1

| LABEL VALUE | COORDINATES | WIDTH | HEIGHT | NEARBY-OBJECT FLAG |
|---|---|---|---|---|
| 1 | (5, 1) | 6 | 1 | ON |
| 2 | (20, 1) | 3 | 1 | ON |

← 300
← 310

(y=2)
x-DIRECTION INFORMATION: -7-6-5-4-3-2-1 4 3 2 1 -15-14-13-12-11-10-9-8-7-6-5-4-3-2-1
y-DIRECTION INFORMATION: -1-1-1-1-1 0 0 0 0 0 -1-1-1-1-1-1-1-1-1 0 0 0 -1-1-1

| LABEL VALUE | COORDINATES | WIDTH | HEIGHT | NEARBY-OBJECT FLAG |
|---|---|---|---|---|
| 1 | (5, 1) | 6 | 2 | ON |
| 2 | (20, 1) | 3 | 1 | ON |

← 302
← 310

(y=3)
x-DIRECTION INFORMATION: -26-25-24-23-22-21-20-19-18-17-16-15-14-13-12-11-10-9-8-7-6-5-4-3-2-1
y-DIRECTION INFORMATION: -1-1-1-1-1 1 1 0 0 0 0 -1-1-1-1-1-1-1-1-1 1 1 -1-1-1

(y=9)
x-DIRECTION INFORMATION: -1-1-1-1-1-1 10 9 8 7 6 5 4 3 2 1 -1-1-1-1-1-1-1-1-1-1
y-DIRECTION INFORMATION: -1-1-1-1-1-1 7 7 6 6 6 6 -1-1-1-1-1-1-1-1-1 7 7 7 -1-1-1

| LABEL VALUE | COORDINATES | WIDTH | HEIGHT | NEARBY-OBJECT FLAG |
|---|---|---|---|---|
| 1 | (5, 1) | 6 | 2 | ON |
| 2 | (20, 1) | 3 | 1 | ON |
| 3 | (6, 9) | 10 | 1 | ON |

← 302
← 310
← 320

FIG.7
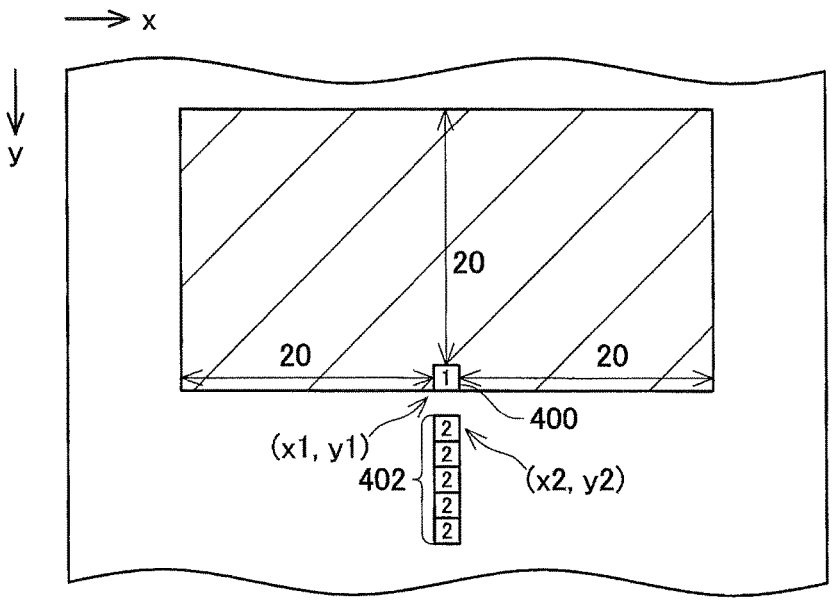
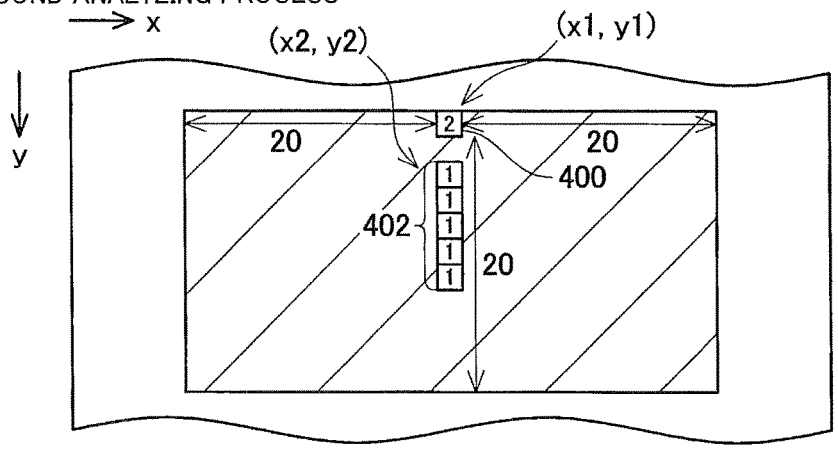

RESULT OF FIRST ANALYZING PROCESS

| LABEL VALUE | COORDINATES | WIDTH | HEIGHT | NEARBY-OBJECT FLAG | LARGE-SIZE FLAG |
|---|---|---|---|---|---|
| 1 | (x3, y3) | 20 | 30 | OFF | ON |
| 2 | (x4, y4) | 1 | 1 | OFF | OFF |
| 3 | (x5, y5) | 2 | 2 | OFF | OFF |
| 4 | (x6, y6) | 2 | 10 | ON | ON |

RESULT OF SECOND ANALYZING PROCESS

| LABEL VALUE | COORDINATES | WIDTH | HEIGHT | NEARBY-OBJECT FLAG | LARGE-SIZE FLAG |
|---|---|---|---|---|---|
| 1 | (x6, y6) | 2 | 10 | OFF | ON |
| 2 | (x5, y5) | 2 | 2 | ON | OFF |
| 3 | (x4, y4) | 1 | 1 | OFF | OFF |
| 4 | (x3, y3) | 20 | 30 | OFF | ON |

FIG.9
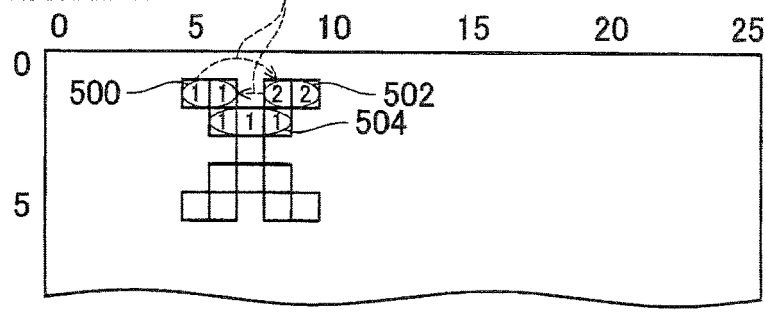
COMPARATIVE EXAMPLE — NEARBY OBJECT BEING PRESENT
(y=1)
| LABEL VALUE | COORDINATES | WIDTH | HEIGHT | NEARBY-OBJECT FLAG |
|---|---|---|---|---|
| 1 | (5, 1) | 2 | 1 | ON |
| 2 | (8, 1) | 2 | 1 | ON |
510
512
(y=2)
| LABEL VALUE | COORDINATES | WIDTH | HEIGHT | NEARBY-OBJECT FLAG |
|---|---|---|---|---|
| 1 | (5, 1) | 5 | 2 | ON |
514
SECOND EMBODIMENT
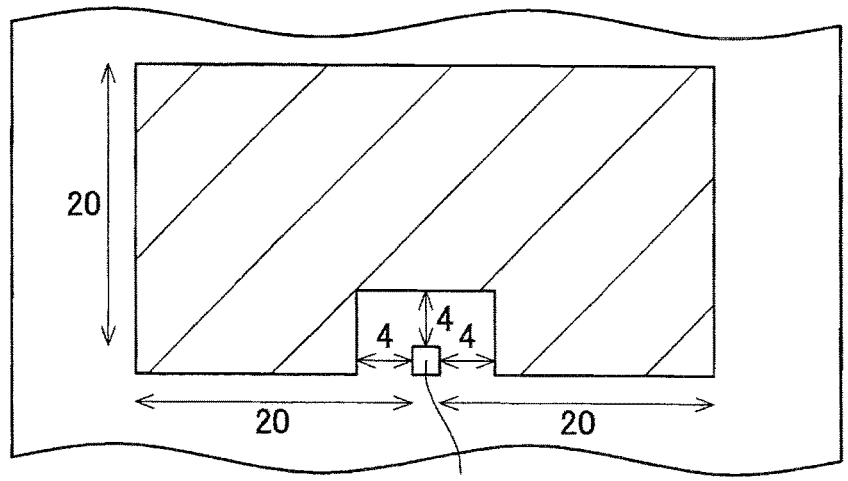
LEFTMOST PIXEL
(y=1)
| LABEL VALUE | COORDINATES | WIDTH | HEIGHT | NEARBY-OBJECT FLAG |
|---|---|---|---|---|
| 1 | (5, 1) | 2 | 1 | OFF |
| 2 | (8, 1) | 2 | 1 | OFF |
520
522
(y=2)
| LABEL VALUE | COORDINATES | WIDTH | HEIGHT | NEARBY-OBJECT FLAG |
|---|---|---|---|---|
| 1 | (5, 1) | 5 | 2 | OFF |
524

IMAGE ANALYZING APPARATUS AND NON-TRANSITORY STORAGE MEDIUM STORING INSTRUCTIONS EXECUTABLE BY THE IMAGE ANALYZING APPARATUS

CROSS REFERENCE TO RELATED APPLICATION

The present application claims priority from Japanese Patent Application No. 2016-175450, which was filed on Sep. 8, 2016, the disclosure of which is herein incorporated by reference in its entirety.

BACKGROUND

The following disclosure relates to an image analyzing apparatus configured to execute an analyzing process using read image data created by reading a document and to a non-transitory storage medium storing a plurality of instructions executable by a computer of the image analyzing apparatus.

There is known a noise remover for removing a noise from image data. One example of the noise is a fine black point (speck). The noise remover identifies a black pixel in the image data as a notable point. When black pixels more than or equal in number to a predetermined number are present in a region located within a distance corresponding to, e.g., three pixels from the notable point, the noise remover determines that the notable point is not a noise. When black pixels more than or equal in number to the predetermined number are absent in the region, the noise remover determines that the notable point is a noise.

SUMMARY

Incidentally, image data normally contains a plurality of line pixel groups arranged in a first direction, e.g., an up and down direction. Each of the line pixel groups is constituted by a plurality of pixels arranged in a second direction orthogonal to the first direction. One example of the second direction is a right and left direction. In most cases, the line pixel groups are sequentially identified from a first side to a second side in the first direction, and a processing is executed for each of the line pixel groups. In the above-described technique, in order to determine whether each notable point contained in a certain line pixel group is a noise, the noise remover has to check not only the certain line pixel group but also three line pixel groups located on an upper side of the certain line pixel group and three line pixel groups located on a lower side of the certain line pixel group. Thus, the noise remover determines whether the notable point is a noise, in a state in which the seven line pixel groups are stored in a working area of a memory.

Accordingly, an aspect of the disclosure relates to a technique for achieving a small memory usage amount when determining whether a predetermined region located near a subject group contains a first-type pixel not contiguous to the subject group.

In one aspect of the disclosure, an image analyzing apparatus includes a controller configured to perform: acquiring read image data created by reading of a document; and executing a first analyzing process based on the acquired read image data. The controller is configured to, in the first analyzing process, perform: sequentially identifying a plurality of line pixel groups from a first side toward a second side in a first direction, wherein the plurality of line pixel groups are arranged in the first direction, wherein each of the plurality of line pixel groups includes a plurality of pixels arranged in a second direction orthogonal to the first direction, wherein each of the plurality of pixels is one of a first-type pixel and a second-type pixel, wherein the first-type pixel is a pixel of a first type, and the second-type pixel is a pixel of a second type; and in a case where an identified m1th line pixel group among the plurality of line pixel groups includes a first subject group constituted by at least one first-type pixel contiguous to each other in the second direction, determining whether the first-type pixel not contiguous to the first subject group is present in a first region surrounding the first subject group, using first relevant information relating to each line pixel group located on a first side of the m1th line pixel group, without using each line pixel group located on a second side of the m1th line pixel group, wherein m1 is an integer greater than or equal to two. The controller is configured to execute a second analyzing process based on the acquired read image data. The controller is configured to, in the second analyzing process, perform: sequentially identifying the plurality of line pixel groups from the second side toward the first side in the first direction; in a case where an identified m2th line pixel group among the plurality of line pixel groups includes the first subject group being identical to the first subject group used in the first analyzing process, determining whether the first-type pixel not contiguous to the first subject group is present in a second region surrounding the first subject group, using second relevant information relating to each line pixel group located on the second side of the m2th line pixel group, without using each line pixel group located on the first side of the m2th line pixel group, wherein m2 is an integer greater than or equal to two, and wherein the controller is configured to, based on a result of the determination in the first analyzing process and a result of the determination in the second analyzing process, execute a first process for an object including the first subject group and constituted by at least one first-type pixel contiguous to each other.

Another aspect of the disclosure relates to a non-transitory storage medium storing a plurality of instructions executable by a computer of an image analyzing apparatus. The plurality of instructions, when executed by the computer, cause the image analyzing apparatus to perform: acquiring read image data created by reading of a document; and executing a first analyzing process based on the acquired read image data. When executed by the computer, the plurality of instructions cause the image analyzing apparatus to, in the first analyzing process, perform: sequentially identifying a plurality of line pixel groups from a first side toward a second side in a first direction, wherein the plurality of line pixel groups are arranged in the first direction, wherein each of the plurality of line pixel groups includes a plurality of pixels arranged in a second direction orthogonal to the first direction, wherein each of the plurality of pixels is one of a first-type pixel and a second-type pixel, wherein the first-type pixel is a pixel of a first type, and the second-type pixel is a pixel of a second type; and in a case where an identified m1th line pixel group among the plurality of line pixel groups includes a first subject group constituted by at least one first-type pixel contiguous to each other in the second direction, determining whether the first-type pixel not contiguous to the first subject group is present in a first region surrounding the first subject group, using first relevant information relating to each line pixel group located on a first side of the m1th line pixel group, without using each line pixel group located on a second side of the m1th line pixel group, wherein m1 is an integer greater than or equal to two. When executed by the computer, the plurality of instructions cause the image analyzing apparatus to execute a second analyzing process based on the acquired read image data. When executed by the computer, the plurality of instructions cause the image analyzing apparatus to, in the second analyzing process, perform: sequentially identifying the plurality of line pixel groups from the second side toward the first side in the first direction; and in a case where an identified m2th line pixel group among the plurality of line pixel groups includes the first subject group being identical to the first subject group used in the first analyzing process, determining whether the first-type pixel not contiguous to the first subject group is present in a second region surrounding the first subject group, using second relevant information relating to each line pixel group located on the second side of the m2th line pixel group, without using each line pixel group located on the first side of the m2th line pixel group, wherein m2 is an integer greater than or equal to two. The controller is configured to, based on a result of the determination in the first analyzing process and a result of the determination in the second analyzing process, execute a first process for an object including the first subject group and constituted by at least one first-type pixel contiguous to each other.

BRIEF DESCRIPTION OF THE DRAWINGS

The objects, features, advantages, and technical and industrial significance of the present disclosure will be better understood by reading the following detailed description of the embodiments, when considered in connection with the accompanying drawings, in which:

FIG. 6 is a view for explaining x-direction information, y-direction information, and the object data;

FIG. 7 is a view for explaining first and second analyzing processes;

FIG. 9 is a view for explaining a comparative example and a second embodiment.

DETAILED DESCRIPTION OF THE EMBODIMENTS

Hereinafter, there will be described embodiments by reference to the drawings.

First Embodiment

Figure 1:
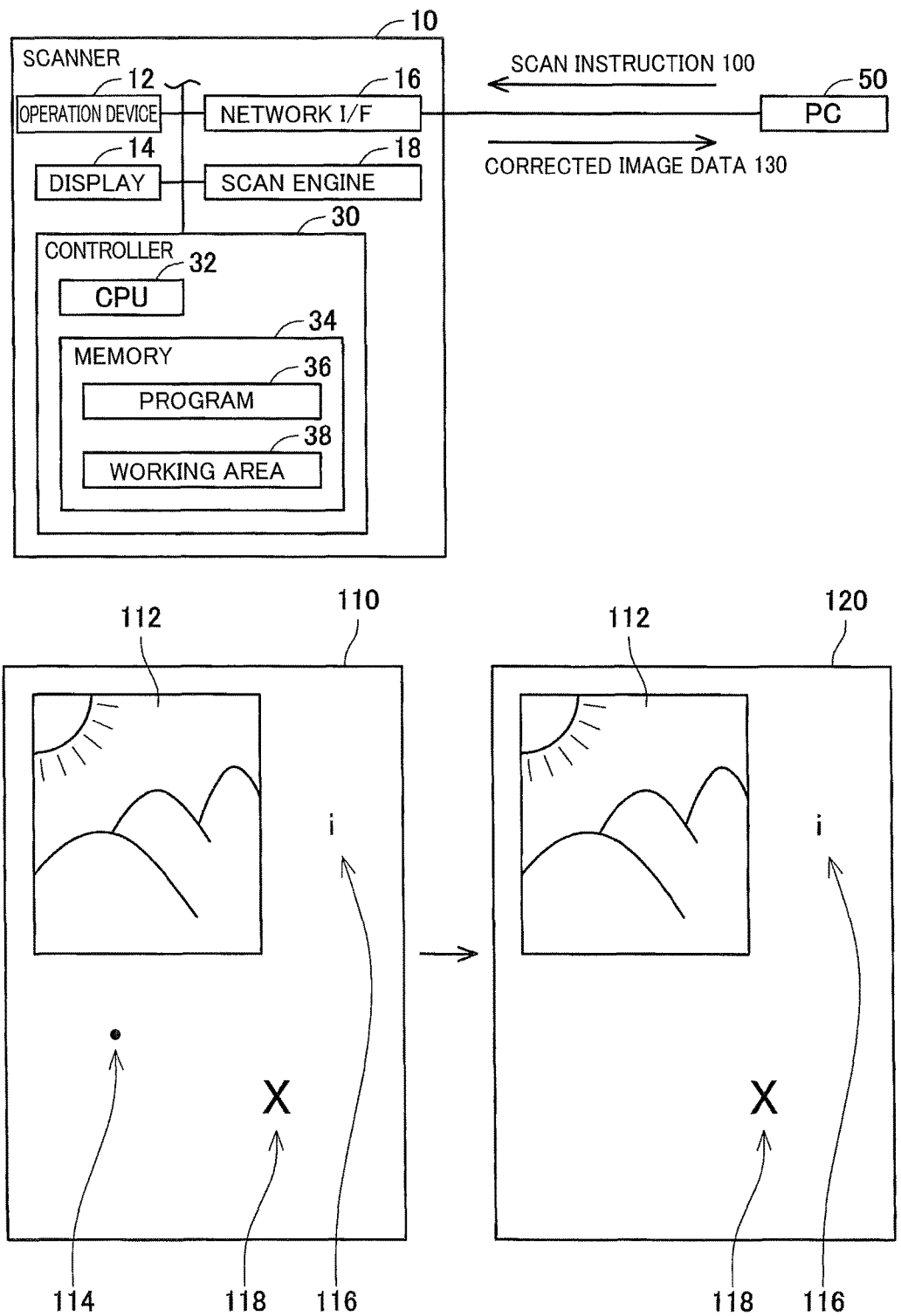
FIG. 1 is a schematic view of a hardware configuration in one embodiment.

First, a configuration of a scanner 10 according to one embodiment will be described with reference to FIG. 1. The scanner 10 is communicably connected to a personal computer (PC) 50 over a local area network (LAN). The scanner 10 includes an operation device 12, a display 14, a network interface 16, a scan engine 18, and a controller 30. The operation device 12 includes a plurality of keys. A user operates the operation device 12 to input various instructions to the scanner 10. The display 14 is configured to display various kinds of information. The display 14 has a touch screen. That is, the display 14 also functions as an operation device. The network interface 16 is connected to the LAN. The scan engine 18 includes a scanning mechanism such as a CCD and a CID.

The controller 30 includes a CPU 32 and a memory 34. The memory 34 includes a read only memory (ROM) and a random access memory (RAM). The CPU 32 is configured to execute various processings according to a program 36 stored in the memory 34. One example of the processings is a processing illustrated in FIG. 2 which will be described below. The RAM of the memory 34 has a working area 38 for temporarily storing information during processing.

The CPU 32 receives a scan instruction 100 from the PC 50 via the network interface 16. The scan instruction 100 includes reading settings such as a reading resolution and a size of a document. The CPU 32 controls the scan engine 18 to read a document using the reading settings and acquires scan data from the scan engine 18. A scan image 110 represented based on the scan data include: an object 112 representing a photograph; and objects 116, 118 respectively representing characters, for example.

In the case where a dust particle adheres to a document or a transparent plate, not illustrated, of the scanner 10 on which the document is placed, for example, the scan image 110 may include an object 114 representing the dust particle (hereinafter referred to as "isolated point"). In the present embodiment, the CPU 32 executes a correcting process for removing the isolated point 114 and creates corrected image data 130 representing a corrected image 120. The CPU 32 transmits the corrected image data 130 to the PC 50 via the network interface 16. These processings enable the CPU 32 to send the PC 50 the image data 130 representing the image 120 with a higher image quality.

Figure 2:
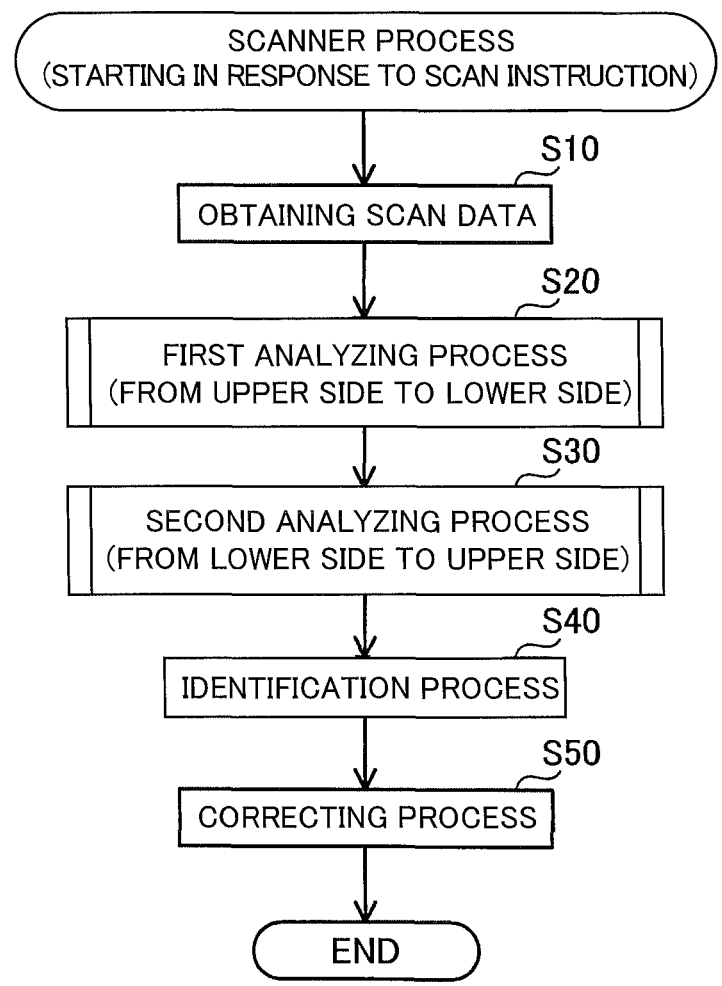
FIG. 2 is a flow chart of a process executed by a scanner.

There will be next explained, with reference to the flow chart in FIG. 2, a scanner process that is executed by the CPU 32 according to the program 36 when the scan instruction 100 is input.

This flow begins with S10 at which the CPU 32 controls the scan engine 18 to read a document and receives scan data from the scan engine 18. The scan data is constituted by: pixels arranged in an x direction (e.g., the right and left direction of the scan image 110 in FIG. 1); and pixels arranged in a y direction (e.g., the up and down direction of the scan image 110 in FIG. 1). In other words, the scan data is constituted by a plurality of reading lines arranged in the y direction. Each of the reading lines is constituted by a plurality of pixels arranged in the x direction. Each of the pixels has a pixel value that is one of 256 gray levels (0-255). Specifically, the pixel value is represented by an R value, a G value, and a B value. In the present embodiment, it is assumed that the document is read at a reading resolution of 100 dpi.

More specifically, the CPU 32 at S10 sequentially acquires the reading lines from the scan engine 18. Each time when the CPU 32 acquires one reading line, the CPU 32 compresses the reading line to create a compressed line and stores the created compressed line into the working area 38 in the memory 34. As a result, compressed scan data constituted by the compressed lines is stored into the working area 38. Since the scan data is stored in the working area 38 in a state in which the scan data is compressed, an amount of usage of the working area 38 is small.

At S20, the CPU 32 executes a first analyzing process using the compressed scan data. In the first analyzing process, the reading lines constituting the scan data are sequentially analyzed from the upper side toward the lower side in the y direction.

At S30, the CPU 32 executes a second analyzing process using the compressed scan data. In the second analyzing process, the reading lines constituting the scan data are sequentially analyzed from the lower side toward the upper side in the y direction.

At S40, the CPU 32 uses a result of the first analyzing process at S20 and a result of the second analyzing process at S30 to execute an identification process for identifying the isolated point.

At S50, the CPU 32 corrects each of pixels which represents the isolated point identified at S40 in the compressed scan data, to a pixel representing a background color of the scan image 110 (white in the present embodiment). As a result, the CPU 32 creates the corrected image data 130 representing the corrected image 120. Though not illustrated, the CPU 32 transmits the corrected image data 130 to the PC 50. When the process at S50 is finished, the flow in FIG. 2 ends.

Figure 3:
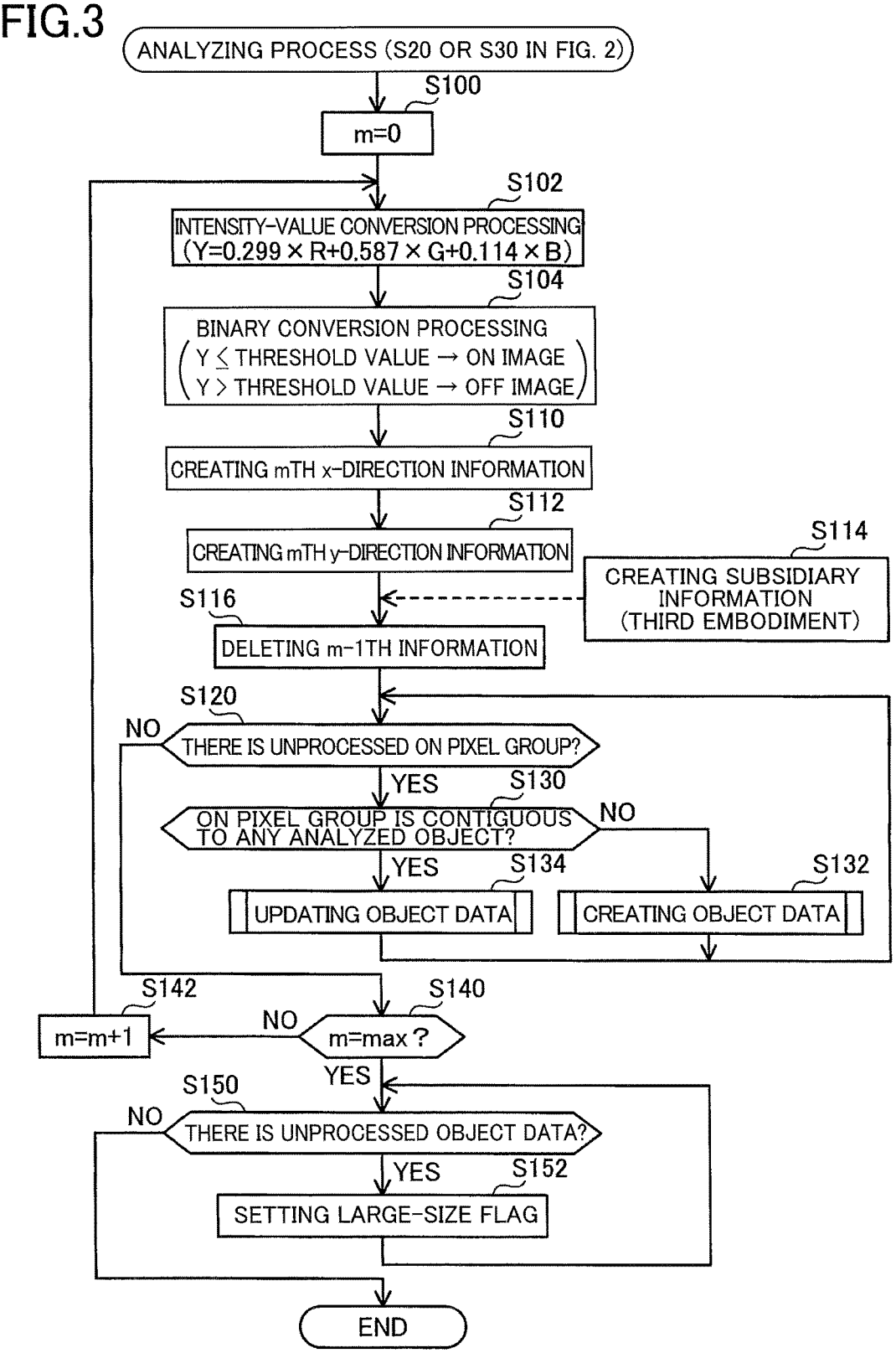
FIG. 3 is a flow chart of an analyzing process.

There will be next explained, with reference to FIG. 3, the first analyzing process executed at S20 in FIG. 2. At S100, the CPU 32 sets a pointer m to "0" to identify the mth reading line, i.e., the 0th reading line. The pointer m indicates a reading line to be processed. In the first analyzing process, as described above, the reading lines constituting the scan data are sequentially analyzed from the upper side toward the lower side in the y direction. Accordingly, the 0th reading line is an uppermost one of the reading lines. More specifically, the CPU 32 at S100 decompresses an uppermost one of the compressed lines constituting the compressed scan data and writes the 0th reading line (i.e., the pixels arranged in the x direction) into the working area 38. In particular, before starting the processing at S100, the CPU 32 allocates a first working area and a second working area in the working area 38. The CPU 32 writes the 0th reading line into the first working area. Information in the first working area is sequentially deleted in a period in which the processing is executed for each line. Information in the second working area is not deleted in the period in which the processing is executed for each line. The information in the second working area is deleted after the completion of the process at S50 which will be described below.

At S102, the CPU 32 executes an intensity-value conversion processing for the mth reading line. Specifically, for each of the pixels constituting the mth reading line, the CPU 32 converts the pixel value represented by the pixel (i.e., the R value, the G value, and the B value) to an intensity value (i.e., a Y value) according to the expression "$Y=0.299\times R+0.587\times G+0.114\times B$" and creates a new pixel representing an intensity value as one of the 256 gray levels (0-255). The CPU 32 then writes an intensity line into the first working area in the working area 38. The intensity line is constituted by a plurality of pixels each representing an intensity value. In the present embodiment, the document read by the scanner 10 has a background of a white color (i.e., R=G=B=255). Thus, an intensity value representing the background of the document (i.e., a Y value) is normally 255, and an intensity value representing each area on the document which differs from the background is normally a value less than 255. When writing the mth intensity line into the first working area at S102, the CPU 32 deletes the mth reading line from the first working area.

At S104, the CPU 32 executes a binary conversion processing for the intensity line created at S102. Specifically, for each of the pixels constituting the intensity line, the CPU 32 converts the intensity value represented by the pixel, into "1" or "0" and creates a new pixel representing "1" or "0". More specifically, the CPU 32 creates a pixel representing "1" when the intensity value is less than or equal to a predetermined threshold value (e.g., 200), and the CPU 32 creates a pixel representing "0" when the intensity value is greater than the threshold value. That is, the pixel representing the background of the document is expressed as "0", and each pixel representing an object different from the background of the document is expressed as "1". The CPU 32 then writes a binary line into the first working area. The binary line is constituted by the pixels each representing "0" or "1". In the following description, the pixel representing "1" and the pixel representing "0" are respectively referred to as "ON pixel" and "OFF pixel". The CPU 32 deletes the mth intensity line from the first working area when writing the mth binary line into the first working area at S104.

At S110, the CPU 32 uses the mth binary line created at S104 to write the mth x-direction information into the first working area. The x-direction information represents arrangement of the ON pixels and the OFF pixels contained in the mth binary line. The x-direction information is expressed as numbers equal in number to the number of pixels in the binary line. That is, the x-direction information is expressed as a sequence of the numbers. For example, in the case where the mth binary line contains one or more ON pixels contiguous to each other, the CPU 32 assigns "1", "2", "3", and so on to the respective ON pixels as the numbers respectively corresponding to the ON pixels, in order in the left direction from a rightmost one of the ON pixels. For example, in the case where the mth binary line contains one or more OFF pixels contiguous to each other, the CPU 32 assings "−1", "−2", "−3", and so on to the respective OFF pixels as the numbers respectively corresponding to the OFF pixels, in order in the left direction from a rightmost one of the OFF pixels.

FIG. 6 illustrates one example of a plurality of the binary lines (eleven binary lines) arranged in the y direction. In reality, a plurality of the binary lines are never stored in the first working area at the same time, and only one binary line is stored in the first working area. In FIG. 6, one binary line is constituted by 26 pixels arranged in the x direction, the rectangular shapes represents the respective ON pixels, and a region containing no rectangular shape represents the OFF pixels. It is noted that each value in the rectangular shape represents a label value which will be explained below. For example, the 0th binary line corresponding to "y=0" is constituted only by the 26 OFF pixels. In this case, the CPU 32 creates a sequence of the numbers "−1, −2, . . . , −26" as the x-direction information in order from the right side toward the left side. Also, the first binary line corresponding to "y=1" is constituted by three OFF pixels 200 (an OFF pixel group 200), three ON pixels 202 (an ON pixel group 202), nine OFF pixels 204 (an OFF pixel group 204), six ON pixels 206 (an ON pixel group 206), and five OFF pixels 208 (an OFF pixel group 208) in order from the right side toward the left side. In this case, the CPU 32 creates a sequence of the numbers "−1, −2, −3, 1, 2, 3, −1, −2, . . . , −9, 1, 2, . . . , 6, −1, −2, . . . , 5" as the x-direction information in order from the right side toward the left side.

The CPU 32 deletes the mth binary line from the first working area when writing the mth x-direction information into the first working area at S110 in FIG. 3. That is, the binary line stored in the first working area is deleted from the first working area before the next binary line is written into the first working area. As a result, the first working area never stores two binary lines at the same time, the CPU 32 executes processings with a small memory usage amount. In a modification, the mth binary line may be written into the first working area in a state in which the m−1th binary line is stored in the first working area. The CPU 32 may delete the m−1th binary line from the first working area when writing the mth x-direction information to the first working area at S110. That is, the binary line stored in the first working area may be deleted from the first working area after the next binary line is written into the first working area.

At S112, the CPU 32 uses the m−1th x-direction information and the m−1th y-direction information to write the mth y-direction information into the first working area. The y-direction information represents, for each of the pixels constituting the mth binary line, a distance between the pixel and the ON pixel located nearest to the pixel among the ON pixels located on an upper side of the pixel in the y direction. That is, the y-direction information represents the number of pixels between the pixel and the nearest ON pixel. The y-direction information is expressed as numbers equal in number to the number of pixels in the binary line. That is, the y-direction information is expressed as a sequence of the numbers. In the following description, one pixel contained in the mth binary line will be referred to as "notable pixel", and a pixel contiguous to the notable pixel in the m−1th binary line (i.e., a pixel located just on the upper side of the notable pixel) will be referred to as "reference pixel". The CPU 32 first reads the number corresponding to the reference pixel (hereinafter referred to as "first number"), from the m−1th x-direction information. In the case where the first number is a positive value, the reference pixel as the ON pixel is contiguous to the notable pixel, and the distance between the notable pixel and the ON pixel located nearest to the notable pixel among the ON pixels located on an upper side of the pixel is zero. Thus, the CPU 32 assigns "0" to the notable pixel in the mth y-direction information. In the case where the first number is a negative value, the reference pixel as the OFF pixel is contiguous to the notable pixel. In this case, the CPU 32 reads the number corresponding to the reference pixel (hereinafter referred to as "second number") from the m−1th y-direction information. In the case where the second number is "−1", there is no ON pixel on an upper side of the notable pixel. Thus, the CPU 32 assigns "−1" to the notable pixel in the mth y-direction information. In the case where the second number is greater than or equal to zero, there is an ON pixel located on an upper side of the notable pixel and not contiguous to the notable pixel. Thus, the CPU 32 assigns a value obtained by adding one to the second number, to the notable pixel in the mth y-direction information.

For example, when the CPU 32 creates the 0th y-direction information (m=0) indicated by "(y=0)" in FIG. 6, no m−1th x-direction information and no m−1th y-direction information exist. In this case, the CPU 32 creates the predetermined sequence of the numbers "−1, −1, . . . , −1" as the 0th y-direction information. When the CPU 32 creates the first y-direction information indicated by "(y=1)", each of the numbers respectively corresponding to all the reference pixels is a negative value in the 0th x-direction information, and each of the numbers respectively corresponding to all the reference pixels is "−1" in the 0th y-direction information. Accordingly, the CPU 32 creates the sequence of the numbers "−1, −1, . . . , −1" as the first y-direction information. When the CPU 32 creates the second y-direction information indicated by "(y=2)", each of the numbers respectively corresponding to the reference pixels 200, 204, 208 is a negative value in the first x-direction information, and each of the numbers respectively corresponding to the reference pixels 200, 204, 208 is "−1" in the first y-direction information. Accordingly, the CPU 32 assigns "−1" to each of the notable pixels 210, 214, 218 in the second y-direction information. Each of the numbers 202x, 206x respectively corresponding to the reference pixels 202, 206 is a positive value in the first x-direction information. Accordingly, the CPU 32 assigns "0" as the numbers 212y, 216y respectively corresponding to the notable pixels 212, 216 in the second y-direction information.

As in the above-described case, the CPU 32 creates the third y-direction information. In this case, each of the numbers 216xa respectively corresponding to reference pixels 216a is a positive value in the second x-direction information. Accordingly, the CPU 32 assigns "0" as each of the numbers 220 respectively corresponding to notable pixels contiguous to the respective reference pixels 216a in the third y-direction information. In the second x-direction information, each of the numbers 212x, 216xb respectively corresponding to the reference pixels 212, 216b is a negative value. In the second y-direction information, each of the numbers 212y, 216y respectively corresponding to the reference pixels 212, 216b is "0". Accordingly, the CPU 32 assigns "1", which is obtained by adding one to "0", as each of the numbers 222, 224 respectively corresponding to notable pixels contiguous to the respective reference pixels 212, 216b in the third y-direction information. As in the above-described case, the CPU 32 creates the fourth and subsequent y-direction information.

At S116 in FIG. 3, the CPU 32 deletes the m−1th x-direction information and the m−1th y-direction information from the first working area. This processing enables the CPU 32 to execute processings at S120 and subsequent steps with a small memory usage amount. In a modification, the CPU 32 may execute the processing at S112 so as to overwrite the m−1th y-direction information with the mth y-direction information. In this case, writing of the mth y-direction information and deletion of the m−1th y-direction information are executed at the same time. In another modification, the CPU 32 may not execute the processing at S116 just after the processing at S112. For example, when an amount of available space in the first working area becomes less than a threshold value, unnecessary information may be deleted from the first working area. That is, when the CPU 32 writes the mth information (i.e., the x-direction information and the y-direction information) into the first working area, the CPU 32 may not delete the m−1th information from the first working area.

At S120, the CPU 32 uses the mth x-direction information to determine whether the mth binary line includes an ON pixel group for which processings at S130-S134 have not been executed yet. Here, the ON pixel group is one or more ON pixels contiguous to each other. In the example in FIG. 6, the 0th binary line is constituted only by the OFF pixels. Thus, the CPU 32 uses the 0th x-direction information to determine that there is no ON pixel group in the 0th binary line (S120: NO), this flow goes to S140. The first binary line includes the two ON pixel groups 202, 206. Thus, when the CPU 32 uses the first x-direction information to determine the first binary line includes the ON pixel group 206 that has not been processed yet (S120: YES), the CPU 32 identifies the ON pixel group 206 as the pixel group to be processed, and this flow goes to S130. In this explanation, the CPU 32 identifies the unprocessed ON pixel groups in order from the left side toward the right side in the mth binary line.

At S130, the CPU 32 uses the mth y-direction information to determine whether the ON pixel group to be processed is contiguous to any of analyzed objects. The analyzed objects are the ON pixel groups in the 0th to m−1th binary lines which have been analyzed as objects in the processings at S132 or S134 which will be described below. Specifically, the CPU 32 identifies, from the mth y-direction information, each of the numbers corresponding to the ON pixel group to be processed. When none of the identified numbers is "0", the CPU 32 determines that the ON pixel group to be processed is not contiguous to any of analyzed objects (S130: NO), and this flow goes to S132. When any of the identified numbers is "0", the CPU 32 determines that the ON pixel group to be processed is contiguous to any of analyzed objects (S130: YES), and this flow goes to S134.

For example, in the case where the ON pixel group 206 in the first binary line in FIG. 6 is a group to be processed, each of the numbers corresponding to the ON pixel group 206 is "−1" in the first y-direction information. In this case, a negative decision (NO) is made at S130, and this flow goes to S132. In the case where the ON pixel group 216a in the second binary line is a group to be processed, each of the numbers 216y corresponding to the ON pixel group 216a is "0" in the second y-direction information. In this case, a positive decision (YES) is made at S130, this flow goes to S134.

At S132, the CPU 32 creates new object data in the second working area (see FIG. 4 which will be described below). At S134, the CPU 32 updates the object data stored in the second working area (see FIG. 5 which will be described below). When the processing at S132 or S134 is finished, this flow returns to S120. For example, after the ON pixel group 206 in the first binary line in FIG. 6 is identified as a group to be processed, and then the processing at S132 is finished, the CPU 32 at S120 identifies the ON pixel group 202 as a group to be processed. When the processing at S132 is finished for the ON pixel group 202, a negative decision (NO) is made at S120, and this flow goes to S140.

At S140, the CPU 32 determines whether the current value of the pointer m is the maximum value. The maximum value is the number of pixels in the scan data in the y direction. When the CPU 32 determines that the current value of the pointer m is not the maximum value (S140: NO), the CPU 32 at S142 adds one to the current value of the pointer m and writes a new reading line into the first working area, and this flow returns to S102. When the CPU 32 determines that the current value of the pointer m is the maximum value (S140: YES), this flow goes to S150.

At S150, the CPU 32 determines whether one or more object data created at S132 and S134 include object data for which a processing at S152 has not been executed yet. When the CPU 32 determines that one or more object data created at S132 and S134 include object data for which the processing at S152 has not been executed (S150: YES), the CPU 32 at S152 sets a large-size flag for the object data, and this flow returns to S150. When the CPU 32 determines that one or more object data created at S132 and S134 include no object data for which the processing at S152 has not been executed (S150: NO), the first analyzing process (the process at S20 in FIG. 2) ends.

Figure 4:
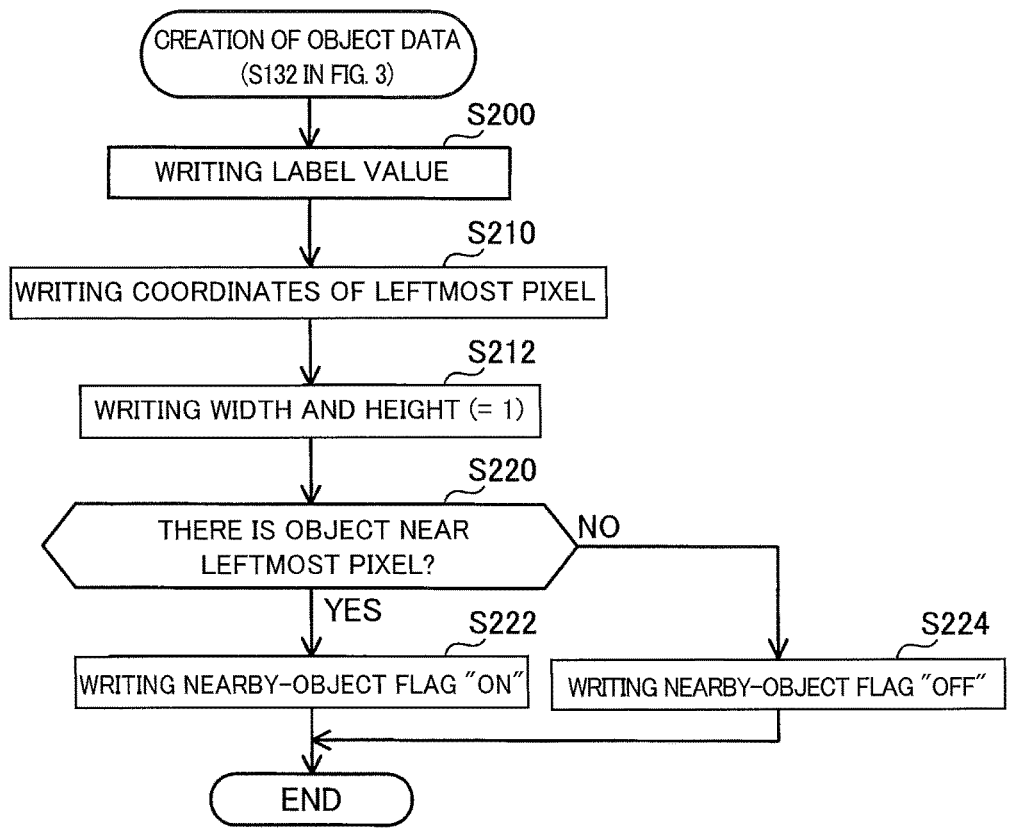
FIG. 4 is a flow chart of a process for creating object data.

There will be next explained, with reference to FIG. 4, a process for creating new object data at S132 in FIG. 3. The object data represents an object constituted by one or more ON pixels contiguous to each other. As illustrated in FIG. 6, the object data is created by associating the label value, coordinates, a width, a height, and a nearby-object flag with each other. The label value is for labeling (identifying) the object. The coordinates of the object data indicate the coordinates of an upper left corner of a rectangular shape circumscribing the object. The width and the height of the object data respectively indicate the number of pixels in the circumscribed rectangular shape in the x direction and the number of pixels in the circumscribed rectangular shape in the y direction. The nearby-object flag indicates one of "ON" and "OFF". The ON state of the nearby-object flag indicates that there is another object or other objects in a predetermined region partly surrounding the object. The OFF state of the nearby-object flag indicates that there is no object in the predetermined region.

The flow in FIG. 4 begins with S200 at which the CPU 32 adds one to the largest label value among the label values written in the first analyzing process and writes an obtained new label value into the second working area. For example, in the case where the ON pixel group 206 in FIG. 6 is a group to be processed, the CPU 32 writes the label value "1" into the second working area.

At S210, the CPU 32 writes the coordinates of the leftmost one of the ON pixels of the ON pixel group to be processed, into the second working area in association with the label value written at S200. For example, in the case where the ON pixel group 206 in FIG. 6 is a group to be processed, the CPU 32 writes the coordinates (5, 1) of the leftmost pixel into the second working area.

At S212, the CPU 32 writes the width and the height of the ON pixel group to be processed into the second working area in association with the label value written at S200. Here, the height is "1". The width is equal to the number of pixels of the ON pixel group to be processed and is acquired from the mth x-direction information. For example, in the case where the ON pixel group 206 in FIG. 6 is a group to be processed, the width "6" of the ON pixel group 206 is acquired from the number 206x corresponding to the ON pixel group 206 in the first x-direction information.

At S220, the CPU 32 determines whether there is another object in the predetermined region partly surrounding the leftmost pixel (i.e., an ON pixel not contiguous to the ON pixel group to be processed). In the x direction, the predetermined region extends rightward from the leftmost pixel by the distance corresponding to twenty pixels and leftward from the leftmost pixel by the distance corresponding to twenty pixels. In the y direction, the predetermined region extends upward from the leftmost pixel by a distance corresponding to the twenty pixels but does not extend downward from the leftmost pixel. For example, in the case where a pixel 400 in FIG. 7 is the leftmost pixel, a hatched region is the predetermined region. In a modification, a value different from twenty pixels may be used. For example, in the case where a document is read at a resolution of 300 dpi, 60 pixels may be used.

Specifically, at S220, the CPU 32 first uses the mth x-direction information to determine whether there is another object in a region extending rightward from the leftmost pixel by the distance corresponding to twenty pixels and leftward from the leftmost pixel by the distance corresponding to twenty pixels. For example, in the case where the ON pixel group 206 in FIG. 6 is a group to be processed, the CPU 32 uses the first x-direction information to determine that the three ON pixels 202 (i.e., the pixels corresponding to the respective numbers 202x) are present in a region extending rightward from the leftmost pixel (i.e., the pixel corresponding to the number "6") by the distance corresponding to twenty pixels (S220: YES). Furthermore, the CPU 32 uses the mth y-direction information to determine whether there is another object in a region extending upward from the leftmost pixel by the distance corresponding to twenty pixels. For example, in the case where the ON pixel group 230 in FIG. 6 is a group to be processed, the CPU 32 uses the ninth y-direction information to determine that the ON pixels 216a and other ON pixels (i.e., the pixels corresponding to the numbers "6" and "7") are present in a region extending upward from the leftmost pixel (i.e., the pixel corresponding to the number "10") by the distance corresponding to twenty pixels (S220: YES). In a modification, the pixel used as a reference of the predetermined region at S220 may not be the leftmost pixel. Other examples of the pixel used as the reference include a central pixel and rightmost pixel in the ON pixel group to be processed.

When the CPU 32 determines that there is another object in the predetermined region (S220: YES), the CPU 32 at S222 writes "ON" as the nearby-object flag in association with the label value written at S200. When the CPU 32 determines that there is no object in the predetermined region (S220: NO), the CPU 32 at S224 writes "OFF" as the nearby-object flag in association with the label value written at S200. As a result of the processing at S222 or S224, new object data is finished, and the process in FIG. 4 ends. For example, in the case where the ON pixel group 206 in FIG. 6 is a group to be processed, new object data 300 is finished, and in the case where the ON pixel group 202 is a group to be processed, new object data 310 is finished.

Figure 5:
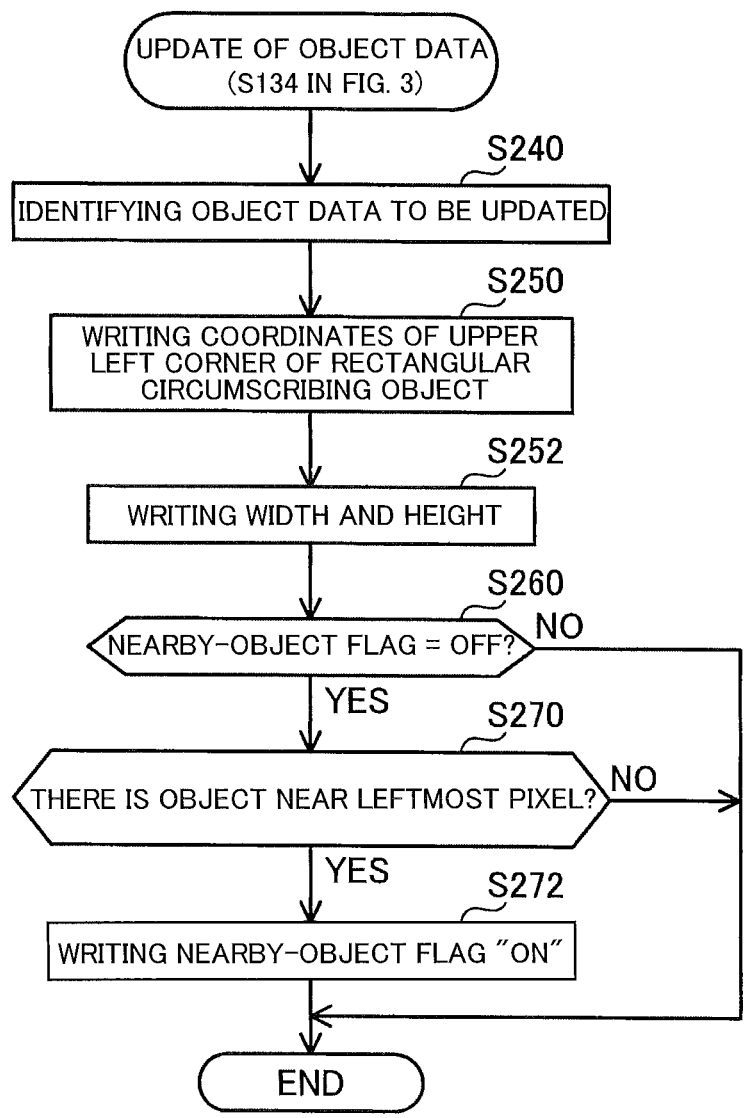
FIG. 5 is a flow chart of a process for updating the object data.

There will be next explained, with reference to FIG. 5, a process for updating the object data at S134 in FIG. 3.

At S240, the CPU 32 identifies object data to be updated. As described above, in the case where the ON pixel group 216a in FIG. 6 is a group to be processed, for example, the CPU 32 determines that the ON pixel group 216a is contiguous to the analyzed object (S130 in FIG. 3: YES). In this case, the CPU 32 identifies the coordinates of at least one pixel (e.g., (7, 1)) located on the upper side of the ON pixel group 216a so as to be contiguous thereto. The CPU 32 uses the coordinates (5, 1), the width "6", and the height "1" contained in the object data 300 in the second working area to identify the inside of the rectangular shape circumscribing the object represented by the object data 300 (i.e., the ON pixel group 206). Since the identified coordinates (7, 1) are located in the identified circumscribed rectangular shape, the CPU 32 identifies the object data 300 as data to be updated. It is noted that in the case where there are a plurality of object data in the second working area, the CPU 32 identifies circumscribed rectangular shapes respectively for the plurality of object data and identifies object data to be updated by checking which circumscribed rectangular shape the identified coordinates are located in.

At S250, the CPU 32 identifies a new circumscribed rectangular shape using (i) the circumscribed rectangular shape identified based on the object data to be updated and (ii) the ON pixel group to be processed. For example, in the case where the ON pixel group 216a in FIG. 6 is a group to be processed, the CPU 32 identifies a new circumscribed rectangular shape 250. In the case where the coordinates contained in the object data to be updated are identical to the coordinates of the upper left corner of the new circumscribed rectangular shape, the CPU 32 updates the former coordinates to the latter coordinates. For example, in the case where the ON pixel group 216a in FIG. 6 is a group to be processed, the coordinates of the upper left corner of the new circumscribed rectangular shape 250 are identical to the coordinates (5, 1) contained in the object data 310 to be updated. In this case, the CPU 32 does not update the coordinates.

At S252, when the width contained in the object data to be updated is not equal to that of the new circumscribed rectangular shape identified at S250, the CPU 32 updates the former width to the latter width. Furthermore, the CPU 32 updates the height contained in the object data to be updated to a new height obtained by adding one to the height contained in the object data to be updated. For example, in the case where the object data 300 is data to be updated, the CPU 32 updates the height "1" to the height "2".

At S260, the CPU 32 determines whether the nearby-object flag contained in the object data to be updated is "OFF". When the CPU 32 determines that the nearby-object flag is "OFF" (S260: YES), this flow goes to S270. When the CPU 32 determines that the nearby-object flag is "ON" (S260: NO), the flow in FIG. 5 ends by skipping S270 and S272. This is because it has been determined that another object is present in the predetermined region partly surrounding the object, and accordingly processings at S270 and S272 need not be executed.

The processing at S270 is similar to the processing at S220. When the CPU 32 determines that there is another object in the predetermined region (S270: YES), this flow goes to S272 at which the CPU 32 updates the nearby-object flag contained in the object data to be updated, from "OFF" to "ON". When the processing at S272 is finished, the flow in FIG. 5 ends. When the CPU 32 determines that there is no object in the predetermined region (S270: NO), this flow ends by skipping S272.

By executing the processes in FIGS. 4 and 5, the CPU 32 creates object data 302 representing an object constituted by the ON pixel groups 206, 216a in the example in FIG. 6. Also, the CPU 32 creates (i) the object data 310 representing the object constituted by the ON pixel group 202 and (ii) object data 320 representing an object constituted by the ON pixel group 230.

There will be next explained the processing at S152 in FIG. 3 in detail. At S152, the CPU 32 sets the large-size flag for the object data. Specifically, in the case where at least one of the width and the height contained in the object data is equal to or more than a distance corresponding to four pixels, the CPU 32 sets "ON" as the large-size flag for the object data. In the case where each of the width and the height contained in the object data is less than the distance corresponding to four pixels, the CPU 32 sets "OFF" as the large-size flag for the object data. In the example in FIG. 6, the CPU 32 sets "ON" as the large-size flag for each of the object data 302, 320 and sets "OFF" as the large-size flag for the object data 310. In a modification, a threshold value different from four pixels may be used. For example, in the case where a document is read at a resolution of 300 dpi, twelve pixels may be used as the threshold value.

There will be next explained, with reference to FIG. 3, the second analyzing process executed at S30 in FIG. 2. The second analyzing process is similar to the first analyzing process except for a processing in which the CPU 32 sequentially analyzes the reading lines constituting the scan data in a direction directed from the lower side toward the upper side in the y direction. The following description will be provided, focusing on the differences from the first analyzing process.

At S100, the CPU 32 identifies the lowest reading line in the y direction as the 0th reading line. At S142, the CPU 32 sequentially identifies the reading lines, each as a new reading line, in order from the lower side toward the upper side in the y direction. The mth y-direction information created at S112 represents, for each of the pixels contained in the mth binary line, a distance (i.e., the number of pixels) between the pixel and the ON pixel located nearest to the pixel among the ON pixels located on a lower side of the pixel in the y direction. At S220 in FIG. 4 and S270 in FIG. 5, the predetermined region extends downward from the leftmost pixel by the distance corresponding to twenty pixels in the y direction and does not extend upward from the leftmost pixel.

FIG. 7 is one example of the results of the first analyzing process and the second analyzing process. In this example, the alphabet "i" is expressed by the one ON pixel 400 and five ON pixels 402 contiguous to each other. In the first analyzing process, the CPU 32 sequentially analyzes the reading lines in order from the upper side toward the lower side in the y direction and creates object data 410 corresponding to the ON pixel 400 and object data 420 corresponding to the five ON pixels 402. When creating the object data 410, the CPU 32 determines whether there is another object (i.e., an ON pixel) in the predetermined region (i.e., the hatched region) located on the upper side of the ON pixel 400 (at S220 in FIG. 4). In this example, the CPU 32 determines that there is no other objects (S220: NO), and the CPU 32 at S224 writes "OFF" as the nearby-object flag. Also, the CPU 32 writes "OFF" as the large-size flag (at S152 in FIG. 3). If the scanner is configured to execute only the first analyzing process without executing the second analyzing process, the scanner only recognizes, based on the object data 410, that no object exists near a subject object constituted by the ON pixel 400 and that the subject object is of a small size. Thus, the scanner may identify the subject object as an isolated point and delete a portion of the alphabet "i" from the scan data. That is, the object not to be deleted may be deleted.

In the present embodiment, in contrast, the CPU 32 in the second analyzing process sequentially analyzes the reading lines in order from the lower side toward the upper side in the y direction and creates object data 430 corresponding to the five ON pixels 402 and object data 440 corresponding to the ON pixel 400. When creating the object data 440, the CPU 32 determines whether there is another object in the predetermined region (i.e., the hatched region) located on the lower side of the ON pixel 400 (at S220 in FIG. 4). In this example, since the CPU 32 determines that there is another object (i.e., the ON pixels 402) (S220: YES), the CPU 32 at S222 writes "ON" as the nearby-object flag. Based on the object data 430, the CPU 32 recognizes that there is another object near the subject object constituted by the ON pixel 400. Accordingly, it is possible to prevent the CPU 32 from identifying the subject object as the isolated point. That is, it is possible to prevent deletion of the object not to be deleted.

There will be next explained the identification process at S40 in FIG. 2 in detail. In the identification process at S40, the CPU 32 uses the results of the first analyzing process at S20 and the second analyzing process at S30 to identify the isolated point. Specifically, the CPU 32 identifies object data containing the nearby-object flag being in the OFF state and the large-size flag being in the OFF state, from among one or more object data obtained in the first analyzing process. It is noted that such object data will be hereinafter referred to as "first notable data". The CPU 32 then identifies object data containing information that matches the coordinates, the width, and the height contained in the first notable data, from among one or more object data obtained in the second analyzing process. It is noted that such object data will be hereinafter referred to as "second notable data". When the nearby-object flag contained in the second notable data is "OFF", the CPU 32 identifies the object represented by the first notable data (i.e., the object represented by the second notable data) as the isolated point.

Figure 8:
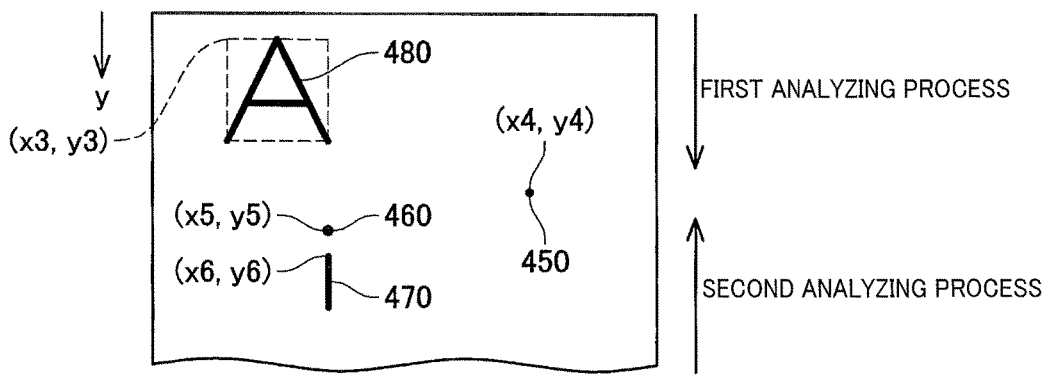
FIG. 8 is a view illustrating results of the first and second analyzing processes.

FIG. 8 illustrates one example of the results of the first analyzing process and the second analyzing process. An object 450 is an isolated point, objects 460, 470 are the alphabet "i", and an object 480 is the alphabet "A". In this example, the CPU 32 first identifies, based on the result of the first analyzing process, first notable data 450a, 460a respectively corresponding to the objects 450, 460. The CPU 32 then identifies, based on the result of the second analyzing process, second notable data 450b containing information that matches the coordinates, the width, and the height contained in the first notable data 450a corresponding to the object 450. Since the nearby-object flag contained in the second notable data 450b corresponding to the object 450 is "OFF", the CPU 32 identifies the object 450 as the isolated point. The CPU 32 identifies, based on the result of the second analyzing process, second notable data 460b containing information that matches the coordinates, the width, and the height contained in the first notable data 460a corresponding to the object 460. Since the nearby-object flag contained in the second notable data 460b corresponding to the object 460 is "ON", the CPU 32 does not identify the object 460 as the isolated point but identifies the object 460 as an object constituting a portion of a character, a drawing, a photograph, or the like. This processing prevents the CPU 32 from deleting the object 460 that constitutes a portion of the alphabet "i". In the result of the first analyzing process, the large-size flag is "ON" in each of object data 470a, 480b respectively corresponding to the objects 470, 480. Accordingly, the CPU 32 does not identify each of the objects 470, 480 as the isolated point but identifies each of the objects 470, 480 as an object such as a character, a drawing, a photograph, or the like. This processing prevents the CPU 32 from deleting the objects 470, 480 not to be deleted. In the present embodiment, the CPU 32 appropriately identifies a type of the object (i.e., the isolated point, an object constituting a portion of a character or the like, or an object such as a character) and appropriately deletes the object to be deleted.

There will be next explained the correcting process at S50 in FIG. 2 in detail. At S50, the CPU 32 identifies the rectangular shape circumscribing the object identified as the isolated point at S40, based on the coordinates, the width, and the height contained in the object data corresponding to the object. The CPU 32 then creates one or more reading lines by decompressing one or more compressed lines containing the region in the identified circumscribed rectangular shape in the compressed scan data. The CPU 32 corrects each of one or more pixels corresponding to the identified region among pixels constituting the created one or more reading lines, to a pixel having a pixel value of a white color (R=G=B=255). This processing deletes the isolated point. In a modification, the CPU 32 may calculate a pixel value, which represents a background color of scanned image, using a well-known technique and correct the pixel to a pixel having the calculated pixel value.

Effects in First Embodiment

In the present embodiment, the scanner 10 creates the mth y-direction information at S112 in FIG. 3. Thus, the scanner 10 may use the created mth y-direction information to determine whether there is another ON pixel not contiguous to the ON pixel group, in the predetermined region partly surrounding the ON pixel group to be processed (S220 in FIG. 4, S270 in FIG. 5). Accordingly, the scanner 10 executes the above-described determination without the need to use each of binary lines located on an upper side of the mth binary line. That is, the scanner 10 executes the above-described determination in a state in which the binary lines are not written in the working area 38. This processing enables the scanner 10 to execute the above-described determination with a small memory usage amount.

In the processing at S220 in FIG. 4 or S270 in FIG. 5 in the first analyzing process (S20 in FIG. 2), the scanner 10 determines whether there is another ON pixel not contiguous to the ON pixel group, in the predetermined region partly surrounding the ON pixel group to be processed. This determination is executed without using binary lines located on a lower side of the mth binary line. That is, this determination is executed in the state in which the binary lines are not written in the working area 38. Also, in the processing at S220 in FIG. 4 or S270 in FIG. 5 in the second analyzing process (S30 in FIG. 2), the scanner 10 executes the above-described determination without using binary lines located on an upper side of the mth binary line. That is, the scanner 10 executes the above-described determination in the state in which the binary lines are not written in the working area 38. This processing enables the scanner 10 to execute the above-described determination with a small memory usage amount.

There will be next explained association of components. The scanner 10 is one example of an image analyzing apparatus. The first working area in the working area 38 is one example of a first specific area, and the second working area in the working area 38 is one example of a second specific area. The y direction is one example of a first direction, and the x direction is one example of a second direction. The upper side is one example of a first side, and the lower side is one example of a second side. The scan data acquired at S10 in FIG. 2 is one example of read image data. The binary lines are one example of a plurality of line pixel groups. The y-direction information created in the first analyzing process is one example of first relevant information. The y-direction information created in the second analyzing process is one example of second relevant information. The ON pixel group 206 in FIG. 6 is one example of a first subject group, and the ON pixel group 216a in FIG. 6 is one example of a second subject group. The predetermined region (i.e., the hatched region) used in the first analyzing process in FIG. 7 is one example of a first region. The predetermined region (i.e., the hatched region) used in the second analyzing process in FIG. 7 is one example of a second region. The correcting process at S50 in FIG. 2 is one example of a first process. Each of the coordinates, the width, and the height contained in the object data is one example of particular information. The nearby-object flag contained in the object data is one example of result information.

Second Embodiment

Before explaining a second embodiment, processings in a comparative example will be explained. FIG. 9 illustrates an object representing a character "X". In the case where the CPU 32 executes the processings at S110-S134 in FIG. 3 for the first binary line, when an ON pixel group 500 is identified at S120 as a group to be processed, the CPU 32 determines at S220 in FIG. 4 whether there is an ON pixel group 502 in a predetermined region partly surrounding the ON pixel group 500 (S220: YES). Thus, the CPU 32 at S222 creates object data 510 containing the nearby-object flag being in the ON state. When the CPU 32 thereafter identifies the ON pixel group 502 as a group to be processed at S120 in FIG. 3, the CPU 32 at S220 in FIG. 4 determines that the ON pixel group 500 is present in the predetermined region partly surrounding the ON pixel group 502 (S220: YES). Thus, the CPU 32 at S222 creates object data 512 including the nearby-object flag being in the ON state.

In the case where the CPU 32 thereafter executes the processings at S110-S134 in FIG. 3 for the second binary line, when an ON pixel group 504 is identified at S120 as a group to be processed, the CPU 32 at S130 determines that the ON pixel group 504 is contiguous to both of the ON pixel groups 500, 502. That is, the CPU 32 determines that the ON pixel groups 500-504 constitute the same object, i.e., the character "X". In this case, it is considered that the object data 510, 512 are integrated into object data 514 corresponding to one object. Since the nearby-object flag is "ON" for each of the object data 510, 512, the CPU 32 writes "ON" as the nearby-object flag for the object data 514. That is, the CPU 32 writes "ON" as the nearby-object flag though there is no object around the object in reality. In this case, the CPU 32 cannot appropriately identify the type of the object (i.e., the isolated point, an object constituting a portion of a character or the like, or an object such as a character).

To appropriately identify the type of the object, the second embodiment is different from the first embodiment in the predetermined region used at S220 in FIG. 4 and S270 in FIG. 5. That is, as illustrated in FIG. 9, the predetermined region (i.e., the hatched region) used in the first analyzing process does not include a region extending from the leftmost pixel in each of the up, right, and left directions by a distance corresponding to four pixels. Though not illustrated, the predetermined region used in the second analyzing process does not include a region extending from the leftmost pixel in each of the down, right, and left directions by a distance corresponding to four pixels. That is, the predetermined region does not contain a region located within a distance corresponding to four pixels from the leftmost pixel and contain a region located outside a distance corresponding to four pixels from the leftmost pixel and within the distance corresponding to twenty pixels from the leftmost pixel. In a modification, a threshold value different from four pixels may be used. In the case where a document is read at a resolution of 300 dpi, twelve pixels may be used as the threshold value.

In the present embodiment, four pixels located on the right side of the ON pixel group 500 are excluded from the predetermined region. Thus, the CPU 32 at S220 in FIG. 4 determines that there is no ON pixel group within the predetermined region partly surrounding the ON pixel group 500 (S220: NO), and the CPU 32 at S222 creates object data 520 containing the nearby-object flag being in the "OFF" state. Also, four pixels located on the left side of the ON pixel group 502 are excluded from the predetermined region. Thus, the CPU 32 at S220 determines that there is no ON pixel group within the predetermined region partly surrounding the ON pixel group 502 (S220: NO), and the CPU 32 at S222 creates object data 522 containing the nearby-object flag being in the "OFF" state. That is, it is possible to prevent the CPU 32 from determining that one of the ON pixel groups 500, 502 constituting the same object is present near the other of the ON pixel groups 500, 502. Thereafter, the CPU 32 at S130 in FIG. 3 determines that the ON pixel group 504 is contiguous to both of the ON pixel groups 500, 502 and at S240-S252 in FIG. 5 integrates the object data 520, 522 into object data 524. Since the nearby-object flag is "OFF" in the object data 520, 522, the CPU 32 appropriately writes "OFF" as the nearby-object flag also for the object data 524.

In the present embodiment, the nearby-object flag is appropriately written, thereby appropriately identifying the type of the object (i.e., the isolated point, an object constituting a portion of a character or the like, or an object such as a character). In the present embodiment, the leftmost pixel of the ON pixel group to be processed is one example of a subject pixel. The four pixels are one example of a first particular distance, and the twenty pixels are one example of a second particular distance.

Third Embodiment

Figure 10:
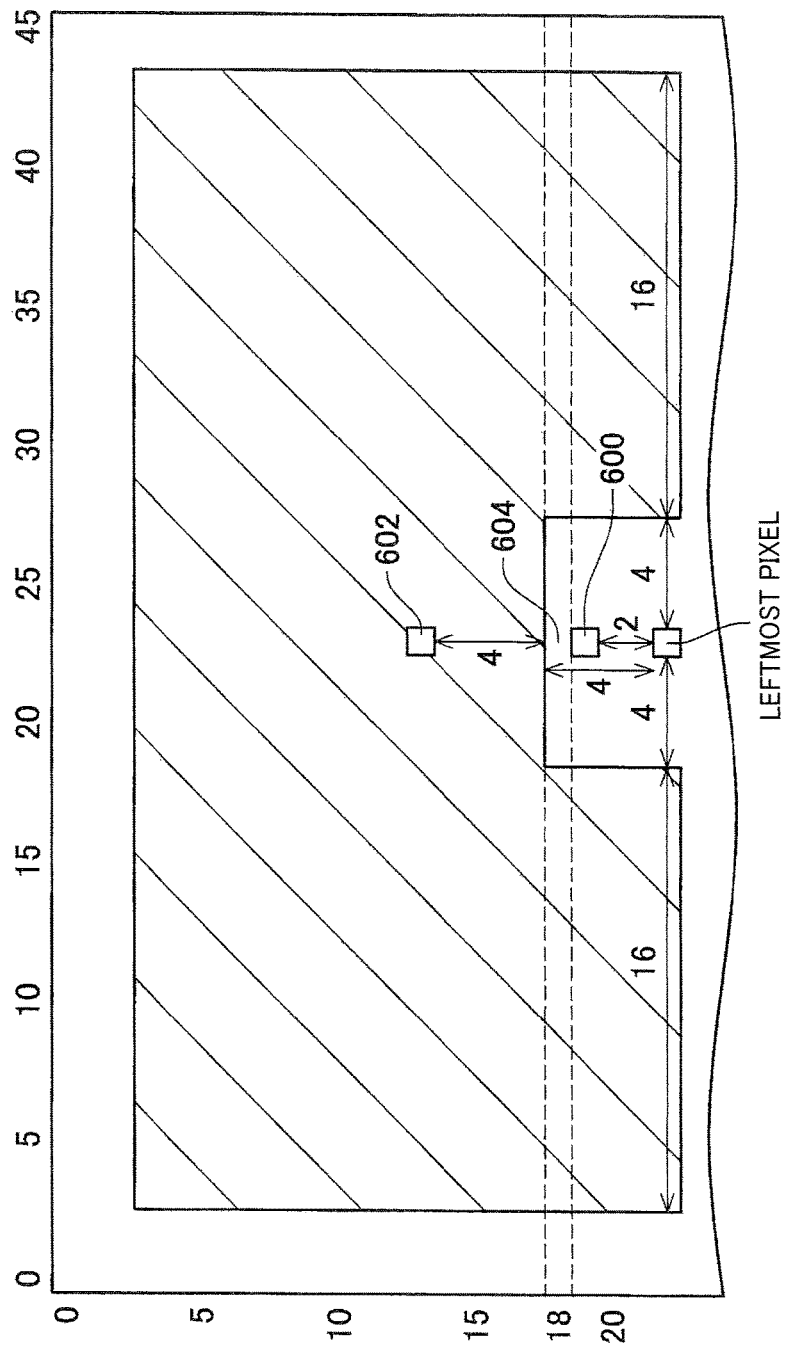
FIG. 10 is a view for explaining a third embodiment.

As in the second embodiment, in the present embodiment, as illustrated in FIG. 10, the predetermined region (i.e., the hatched region) used at S220 in FIG. 4 and S270 in FIG. 5 does not contain a region located within a distance corresponding to four pixels from the leftmost pixel and contains a region located outside a distance corresponding to four pixels from the leftmost pixel and within the distance corresponding to twenty pixels from the leftmost pixel. In the example in FIG. 10, there are ON pixels 600, 602 on an upper side of the leftmost pixel. In this case, the 22nd y-direction information contains, as the number corresponding to the leftmost pixel, "2" that is a distance between the leftmost pixel and the ON pixel 600. That is, the 22nd y-direction information does not contain information about the ON pixel 602. As a result, if the CPU 32 executes the determination at S220 and S270 using only the 22nd y-direction information, the CPU 32 determines that there is no ON pixel in the predetermined region because the ON pixel 600 is not contained in the predetermined region, and the CPU 32 does not recognize the ON pixel 602. That is, the CPU 32 executes wrong determination though the ON pixel 602 is contained in the predetermined region in reality.

In the present embodiment, the CPU 32 creates subsidiary information at S114 in FIG. 3 to avoid the above-described wrong determination. Here, the subsidiary information is m−4th y-direction information. The "4" represents the number of pixels partly surrounding the leftmost pixel and excluded from the predetermined region. Specifically, the CPU 32 at S114 uses the m−4th binary line as in the processings at S102-S112 to create m−4th x-direction information and the subsidiary information, i.e., the m−4th y-direction information. In particular, the CPU 32 uses the m−5th x-direction information and the m−5th y-direction information to create the subsidiary information, i.e., the m−4th y-direction information.

At S220 in FIG. 4 and S270 in FIG. 5, the CPU 32 uses the subsidiary information, i.e., the m−4th y-direction information to determine whether there is an ON pixel in the predetermined region located on an upper side of the leftmost pixel. In the example in FIG. 10, the 18th y-direction information as the subsidiary information contains "4", which is a distance between the OFF pixel 604 and the ON pixel 602, as the number corresponding to an OFF pixel 604 located at the same position as the leftmost pixel in the x direction. Accordingly, use of the subsidiary information enables the CPU 32 to appropriately determine that the ON pixel 602 is present in the predetermined region located on an upper side of the leftmost pixel.

While the embodiments have been described above, it is to be understood that the disclosure is not limited to the details of the illustrated embodiments, but may be embodied with various changes and modifications, which may occur to those skilled in the art, without departing from the spirit and scope of the disclosure.

In each of the above-described embodiments, the CPU 32 identifies the object constituting the isolated point at S40 in FIG. 2. In a first alternative embodiment, the CPU 32 may identify the object constituting the character. In this case, a threshold value for distinguishing between "ON" and "OFF" of the large-size flag at S152 in FIG. 3 may be the number of pixels which corresponds to 2 cm. The number of pixels depends on a reading resolution. At S40 in FIG. 2, the CPU 32 identifies object data containing the large-size flag being in the "OFF" state and containing the nearby-object flag being in the "ON" state as a result of at least one of the first analyzing process and the second analyzing process. The character in most cases has a width and a height of less than 2 cm. Furthermore, there are usually other characters around the character. Thus, the object data containing the large-size flag being in the "OFF" state and containing the nearby-object flag being in the "ON" state in most cases represents an object representing the character. At S50 in FIG. 2, the CPU 32 executes optical character recognition (OCR) for each object identified as a character. That is, the CPU 32 need not execute OCR for each object not identified as a character, that is, the CPU 32 need not execute OCR for the entire scan image, resulting in higher speed of OCR. In the present embodiment, the number of pixels which corresponds to 2 cm is one example of a second threshold value, and OCR is one example of a first process.

In a second alternative embodiment, the x-direction information may not be created at S110 in FIG. 3. In this case, the CPU 32 may at S112 create the mth y-direction information by using the m−1th binary line instead of the m−1th x-direction information.

In a third alternative embodiment, the y-direction information may not be created at S112 in FIG. 3. In this case, at S220 in FIG. 4 and S270 in FIG. 5, the CPU 32 may write the m−20th to mth binary lines into the working area and use the written binary lines to determine whether there is an ON pixel in the predetermined region. In the present alternative embodiment, each of the m−20th to mth binary lines is one example of the first relevant information and the second relevant information.

In a fourth alternative embodiment, in the case where reading is performed for an image having white characters on solid fill of black, for example, white isolated points different from the white characters may be formed on the solid fill of black. To remove the white isolated points, the CPU 32 may at S120 in FIG. 3 identify the OFF pixel group to be processed and at S220 in FIG. 4 and S270 in FIG. 5 determine whether there is another OFF pixel in the predetermined region partly surrounding the leftmost pixel of the OFF pixel group to be processed. Then, the CPU 32 may at S50 in FIG. 2 correct each of the pixels corresponding to the object representing the isolated points, to pixels representing a black color. In the present alternative embodiment, the OFF pixel is one example of a first-type pixel, and the ON pixel is one example of a second-type pixel.

There will be explained a fifth alternative embodiment. For example, a situation in which the scanner reads a document containing only character strings is assumed. Since there are characters around a certain character in most cases, the CPU 32 does not need the large-size flag to identify, as a character, the object corresponding to the nearby-object flag being in the ON state. That is, the CPU 32 does not need the large-size flag to identify, as an isolated point, the object corresponding to the nearby-object flag being in the "OFF" state. Accordingly, the size of the object may not be considered in each of the above-described first to third embodiments.

In a sixth alternative embodiment, for example, the CPU 32 may at S10 in FIG. 2 execute what is called binary scanning for a document to create compressed scan representing a binary image constituted by the ON pixels and the OFF pixels. In the present alternative embodiment, the processings at S102 and S104 in FIG. 3.

In a seventh alternative embodiment, each of the processings in FIG. 2 may be executed by a scanner driver installed in the PC 50. That is, the image analyzing apparatus is not limited to the scanner and may be any device capable of analyzing an image. Examples of such device include personal computers, servers, multi-function peripherals, and smartphones.

In the above-described embodiments, the CPU 32 of the scanner 10 executes the program 36 (i.e., software) to execute the processings in FIGS. 2-10. In an eighth alternative embodiment, at least one of the processings in FIGS. 2-10 may be executed by hardware such as a logic circuit.

The technical components described in the present specification or the drawings exhibit technical utility alone or in various combinations, and are not limited to the combinations disclosed in the claims at the time of filing. Furthermore, the techniques illustrated in the present specification or the drawings may simultaneously achieve a plurality of objects, and have technical utility by achieving one of these objects. Also, the present disclosure may be achieved in other forms such as a method of analyzing an image.

What is claimed is:

1. An image analyzing apparatus comprising a processor and a memory, the processor configured to perform:
    acquiring read image data created by reading of a document;
    executing a first analyzing process based on the acquired read image data; and
    storing a result of the first analyzing process,
    wherein the processor is configured to, in the first analyzing process, perform:
        sequentially identifying a plurality of line pixel groups from a first side of the acquired read image data toward a second side of the acquired read image data in a first direction, wherein the plurality of line pixel groups are arranged in the first direction, wherein each of the plurality of line pixel groups comprises a plurality of pixels arranged in a second direction orthogonal to the first direction, wherein each of the plurality of pixels is one of a first-type pixel and a second-type pixel, wherein the first-type pixel is a pixel representing an object different from a background of the document, and the second-type pixel is a pixel representing the background of the document; and
        in a case where an identified m1th line pixel group among the plurality of line pixel groups comprises a first subject group constituted by a plurality of first-type pixels contiguous to each other in the second direction, determining, based on first relevant information stored in the memory, whether at least one first-type pixel not contiguous to the plurality of first type pixels of the first subject group is present in a first region surrounding the first subject group, wherein the first relevant information relates to each line pixel group located on a first side of the m1th line pixel group, wherein the determination is performed without using each line pixel group located on a second side of the m1th line pixel group, wherein m1 is an integer greater than or equal to two, storing a result of the determination in the first analyzing process into the memory,
    wherein the processor is configured to execute a second analyzing process based on the acquired read image data,
    wherein the processor is configured to, in the second analyzing process, perform:
        sequentially identifying the plurality of line pixel groups from the second side of the acquired read image data toward the first side of the acquired read image data in the first direction;
        in a case where an identified m2th line pixel group among the plurality of line pixel groups comprises the first subject group being identical to the first subject group used in the first analyzing process, determining, based on second relevant information stored in the memory, whether at least one first-type pixel not contiguous to the plurality of first type pixels of the first subject group is present in a second region surrounding the first subject group, wherein the second relevant information relates to each line pixel group located on the second side of the m2th line pixel group, wherein the determination is performed without using each line pixel group located on the first side of the m2th line pixel group, wherein m2 is an integer greater than or equal to two,
        storing a result of the determination in the second analyzing process into the memory, and
    wherein, in a case where the processor determines an absence of the at least one first-type pixels in the first region, an absence of the at least one first-type pixels in the second region, and in a case where a size of a particular object that comprises the first subject group in the read image data is less than a first threshold value, the processor is configured to, based on the result of the determination in the first analyzing process stored in the memory and the result of the determination in the second analyzing process stored in the memory, identify the particular object as a noise object and execute a correction process for correcting each pixel of the noise object to a pixel representing a background color of the document, wherein the noise object comprises the first subject group and is constituted by the plurality of first-type pixels contiguous to each other, and wherein correcting each pixel of the noise object comprises assigning a background pixel value to each pixel being corrected.

2. The image analyzing apparatus according to claim 1, wherein the processor is configured to execute the correction process for the particular object in a case where the result of the determination in the first analyzing process for the first subject group matches the result of the determination in the second analyzing process for the first subject group, and
    wherein the processor is configured not to execute the correction process for the particular object in a case where the result of the determination in the first analyzing process for the first subject group does not match the result of the determination in the second analyzing process for the first subject group.

3. The image analyzing apparatus according to claim 1, wherein the processor is configured to, in the first analyzing process, perform:
    identifying the m1th line pixel group by writing the m1th line pixel group into a first specific area in the memory; and
    deleting an (m1−1)th line pixel group from the first specific area before writing the m1th line pixel group into the first specific area, and
wherein the processor is configured to, in the second analyzing process, perform:

identifying the m2th line pixel group by writing the m2th line pixel group into the first specific area; and deleting an (m2−1)th line pixel group from the first specific area before writing the m2th line pixel group into the first specific area.

4. The image analyzing apparatus according to claim 1, wherein the processor is configured to execute the correction process for the particular object, based on the result of the determination in the first analyzing process for the first subject group, the result of the determination in the second analyzing process for the first subject group, and a size of the particular object.

5. The image analyzing apparatus according to claim 1, wherein the processor is configured to determine that the particular object is a character and execute the correction process as a processing relating to the character, in a case where a size of the particular object is less than a second threshold value and in a case where the processor determines that the first-type pixel is present in at least one of the first region and the second region in at least one of the determination in the first analyzing process for the first subject group and the determination in the second analyzing process for the first subject group.

6. The image analyzing apparatus according to claim 1, wherein each of the first region and the second region does not comprise a region located within a first particular distance from a subject pixel contained in the first subject group and comprises a region located outside the first particular distance from the subject pixel and within a second particular distance from the subject pixel.

7. The image analyzing apparatus according to claim 1, wherein the processor is configured to perform:

in a case where identifying the m1th line pixel group, storing (i) particular information for identifying a position and a size of the particular object and (ii) result information indicating the result of the determination in the first analyzing process for the first subject group, into the memory in a state in which the particular information and the result information are associated with each other;

updating the particular information when an (m1+1)th line pixel group of the plurality of line pixel groups is identified and when the (m1+1)th line pixel group comprises a second subject group constituted by a plurality of first-type pixels contiguous to each other in the second direction each as the first-type pixel; and updating the result information associated with the particular information, when the processor determines that the first-type pixel is absent in the first region in the determination in the first analyzing process for the first subject group.

8. The image analyzing apparatus according to claim 1, wherein the processor is configured to, in the first analyzing process, perform:

identifying an (m1−1)th line pixel group by writing the (m1−1)th line pixel group into a first specific area in the memory;

deleting the (m1−1)th line pixel group from the first specific area before writing the m1th line pixel group into the first specific area;

when identifying the m1th line pixel group, storing (i) particular information for identifying a position and a size of the particular object and (ii) result information indicating the result of the determination in the first analyzing process for the first subject group, into a second specific area in the memory in a state in which the particular information and the result information are associated with each other; and deleting the particular information and the result information from the second specific area after the first analyzing process and the second analyzing process are finished.

9. A non-transitory storage medium storing a plurality of instructions executable by a computer of an image analyzing apparatus, the computer comprising a processor and a memory, the plurality of instructions, when executed by the computer, causing the image analyzing apparatus to perform:

acquiring read image data created by reading of a document;

executing a first analyzing process based on the acquired read image data; and storing a result of the first analyzing process, wherein when executed by the computer, the plurality of instructions cause the image analyzing apparatus to, in the first analyzing process, perform:

sequentially identifying a plurality of line pixel groups from a first side acquired read image data toward a second side acquired read image data in a first direction, wherein the plurality of line pixel groups are arranged in the first direction, wherein each of the plurality of line pixel groups comprises a plurality of pixels arranged in a second direction orthogonal to the first direction, wherein each of the plurality of pixels is one of a first-type pixel and a second-type pixel, wherein the first-type pixel is a pixel representing an object different from a background of the document, and the second-type pixel is a pixel representing the background of the document; and in a case where an identified m1th line pixel group among the plurality of line pixel groups comprises a first subject group constituted by a plurality of first-type pixels contiguous to each other in the second direction, determining, based on first relevant information stored in the memory, whether at least one first-type pixel not contiguous to the plurality of first type pixels of the first subject group is present in a first region surrounding the first subject group, wherein the first relevant information relates to each line pixel group located on a first side of the m1th line pixel group, wherein the determination is performed without using each line pixel group located on a second side of the m1th line pixel group, wherein m1 is an integer greater than or equal to two, storing a result of the determination in the first analyzing process into the memory, wherein when executed by the computer, the plurality of instructions cause the image analyzing apparatus to execute a second analyzing process based on the acquired read image data, wherein when executed by the computer, the plurality of instructions cause the image analyzing apparatus to, in the second analyzing process, perform:

sequentially identifying the plurality of line pixel groups from the second side of the acquired read image data toward the first side of the acquired read image data in the first direction; and in a case where an identified m2th line pixel group among the plurality of line pixel groups comprises the first subject group being identical to the first subject group used in the first analyzing process, determining, based on second relevant information stored in the memory, whether at least one first-type pixel not contiguous to the plurality of first type pixels of first subject group is present in a second region surrounding the first subject group, wherein the second relevant information relates to each line pixel group located on the second side of the m2th line pixel group, where the determination is performed without using each line pixel group located on the first side of the m2th line pixel group, wherein m2 is an integer greater than or equal to two, storing a result of the determination in the second analyzing process into the memory, and wherein, in a case where the processor determines an absence of the at least one first-type pixels in the first region, an absence of the at least one first-type pixels in the second region, and in a case where a size of a particular object that comprises the first subject group in the read image data is less than a first threshold value, the processor is configured to, based on the result of the determination in the first analyzing process stored in the memory and a result of the determination in the second analyzing process stored in the memory, identify the particular object as a noise object and execute a correction process for correcting each pixel of the noise object to a pixel representing a background color of the document, wherein the particular object comprises the first subject group and constituted by the plurality of first-type pixels contiguous to each other, and wherein correcting each pixel of the noise object comprises assigning a background pixel value to each pixel being corrected.

\* \* \* \* \*